(12) United States Patent
Boyle et al.

(10) Patent No.: US 8,011,482 B2
(45) Date of Patent: Sep. 6, 2011

(54) ELECTRIC ACTUATOR UNIT FOR A VEHICLE BRAKE ASSEMBLY

(75) Inventors: Brian Boyle, Farmington Hills, MI (US); David Kwierant, Ann Arbor, MI (US); Ralf Leiter, Mendig (DE)

(73) Assignee: Kelsey-Hayes Company, Livonia, MI (US)

( * ) Notice: Subject to any disclaimer, the term of this patent is extended or adjusted under 35 U.S.C. 154(b) by 486 days.

(21) Appl. No.: 12/084,277

(22) PCT Filed: Oct. 26, 2006

(86) PCT No.: PCT/US2006/042162
§ 371 (c)(1), (2), (4) Date: Apr. 29, 2008

(87) PCT Pub. No.: WO2007/089300
PCT Pub. Date: Aug. 9, 2007

(65) Prior Publication Data
US 2009/0260929 A1 Oct. 22, 2009

(51) Int. Cl.
*F16D 65/14* (2006.01)
(52) U.S. Cl. ............................ 188/2 D; 188/156
(58) Field of Classification Search ............ 188/2 D, 188/156, 158, 162, 325–340
See application file for complete search history.

(56) References Cited

U.S. PATENT DOCUMENTS

| | | | |
|---|---|---|---|
| 5,310,026 A | | 5/1994 | Shaw et al. |
| 5,529,149 A | * | 6/1996 | Johannesen et al. ........ 188/70 R |
| 5,769,189 A | | 6/1998 | Heibel et al. |
| 5,865,275 A | | 2/1999 | Anger et al. |
| 6,364,085 B1 | | 4/2002 | Ueno et al. |
| 6,446,768 B2 | | 9/2002 | Kikuta et al. |
| 2002/0084154 A1 | * | 7/2002 | Peter ............................ 188/156 |
| 2004/0055833 A1 | * | 3/2004 | Tatsumi et al. ............... 188/2 D |
| 2006/0278477 A1 | | 12/2006 | Balz et al. |
| 2007/0151818 A1 | | 7/2007 | Linhoff et al. |

FOREIGN PATENT DOCUMENTS

| | | |
|---|---|---|
| DE | 10 2004 049 434 A1 | 10/2005 |
| DE | 10 2005 056 221 A1 | 7/2006 |
| WO | WO 2004/059189 A1 | 7/2004 |
| WO | WO 2005/070736 A2 | 8/2005 |

* cited by examiner

*Primary Examiner* — Christopher P Schwartz
(74) *Attorney, Agent, or Firm* — MacMillan, Sobanski & Todd, LLC

(57) ABSTRACT

An improved structure for an electric actuator unit for use in a brake assembly. According to an embodiment, a drum brake assembly comprises a mounting flange having an abutment; a backing plate secured to the mounting flange, the backing plate having a pair of brake shoes supported thereon; and an electric actuator unit for actuating the drum brake assembly to selectively move the brake shoes between a braking and a non-braking position, the electric actuator unit including a motor, a gear-set operatively coupled to be driven by the motor, a spindle nut operatively coupled to be rotationally driven by the gear-set, a pull rod operatively coupled to be translatorily driven by the spindle nut, and a brake shoe actuation link assembly operatively coupled to be actuated by the pull rod to thereby move the brake shoes between the braking and non-braking positions, the pull rod being operatively coupled to the brake shoe actuation link assembly by a link, the link having a first end pivotally connected to the pull rod and a second end pivotally connected to a second member of the brake shoe actuation link assembly.

20 Claims, 9 Drawing Sheets

ELECTRIC ACTUATOR UNIT FOR A VEHICLE BRAKE ASSEMBLY

BACKGROUND OF THE INVENTION

This invention relates in general to vehicle drum and disc brake assemblies and in particular to an improved structure for an electric actuator unit for such vehicle brake assemblies.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. In some instances, the disc brake assembly can be a "drum-in-hat" type of disc brake assembly. The brake assemblies are actuated by hydraulic or pneumatic pressure generated when an operator of the vehicle depresses a brake pedal. The structures of these drum brake assemblies and disc brake assemblies, as well as the actuators therefor, are well known in the art.

A typical drum-in-hat type of disc brake assembly includes a hydraulically or pneumatically actuated disc service brake and a mechanically actuated drum-in-hat parking and emergency brake. The disc service brake includes a rotor which is secured to the wheel of the vehicle for rotation therewith. The rotor includes a pair of opposed friction plates which are selectively engaged by portions of a caliper assembly. The interior of the rotor defines a cylindrical braking surface.

A caliper assembly is slidably supported by pins secured to a mounting flange. The mounting flange is secured to a non-rotatable component of the vehicle, such as the steering knuckle or the axle flange. The caliper assembly includes a pair of brake shoes which are disposed on opposite sides of the rotor. The brake shoes are operatively connected to one or more hydraulically actuated pistons for movement between a non-braking position, wherein they are spaced apart from the opposed friction plates of the rotor, and a braking position, wherein they are moved into frictional engagement with the opposed friction plates of the rotor. When the operator of the vehicle depresses the brake pedal, the piston urges the brake shoes from the non-braking position to the braking position so as to frictionally engage the friction plates of the rotor and thereby slow or stop the rotation of the associated wheel of the vehicle.

The drum-in-hat parking and emergency brake includes a pair of opposed arcuate brake shoes which are supported on a backing plate for selective movement relative thereto. The backing plate is secured to the mounting flange, or alternatively, can be formed integral therewith. Each of the brake shoes has a friction pad or lining secured thereto. The brake shoes extend within the cylindrical braking surface of the rotor. To effect parking and emergency braking action, the operator of the vehicle manually pulls an actuating lever. The lever is connected to an actuation cable having a park brake cable end which, when pulled, actuates a mechanical actuating mechanism. The actuating mechanism is located adjacent one of the ends of the brake shoes and is operative to move the brake shoes outwardly apart from one another such that the friction pads frictionally engage the cylindrical braking surface of the rotor. Such frictional engagement causes slowing or stopping of the rotational movement of the rotor and, therefore, the wheel of the vehicle in a controlled manner.

SUMMARY OF THE INVENTION

This invention relates to an improved structure for an electric actuator unit for use in a vehicle brake assembly.

According to an embodiment, a drum brake assembly comprises a mounting flange having an abutment; a backing plate secured to the mounting flange, the backing plate having a pair of brake shoes supported thereon; and an electric actuator unit for actuating the drum brake assembly to selectively move the brake shoes between a braking and a non-braking position, the electric actuator unit including a motor, a gear-set operatively coupled to be driven by the motor, a spindle nut operatively coupled to be rotationally driven by the gear-set, a pull rod operatively coupled to be translatorily driven by the spindle nut, and a brake shoe actuation link assembly operatively coupled to be actuated by the pull rod to thereby move the brake shoes between the braking and non-braking positions, the pull rod being operatively coupled to the brake shoe actuation link assembly by a link, the link having a first end pivotally connected to the pull rod and a second end pivotally connected to a second member of the brake shoe actuation link assembly.

According to an embodiment, the drum brake assembly is a drum-in-hat disc brake assembly and the electric actuator unit is for actuating a parking and emergency brake of the drum-in-hat disc brake assembly.

According to an embodiment, the electric actuation unit further includes a spring member operatively coupled to the pull rod for applying a follow up force to the pull rod when the brake shoes are in the braking position and allows an adaptation of the electric actuation unit to different types of vehicles.

According to an embodiment, the electric actuation unit further includes a cartridge housing, the cartridge housing adapted to carry the spring member, the spindle nut and the pull rod.

According to an embodiment, the motor defines a first axis and the spindle nut and pull rod define a second axis which is parallel to the first axis.

According to an embodiment, the motor defines a first axis, the spindle nut defines a second axis, and the pull rod defines a third axis, the first, second and third axes being parallel to one another.

According to an embodiment, the second member of the brake shoe actuation link assembly is pivotally connected to a first member of the brake shoe actuation link assembly.

According to an embodiment, one of the link and the second member includes a raised tab, the other one of the link and the second member includes a countersunk opening, and wherein the link is operatively coupled to the second member by deforming a portion of the raised tab into the countersunk opening.

According to an embodiment, the pull rod includes an externally threaded portion and the spindle nut includes an internally threaded portion which meshes with the externally threaded portion of the pull rod whereby rotation of the spindle nut causes translatory movement of the pull rod.

According to an embodiment, the pull rod includes an enlarged head, the spindle nut includes a shoulder, and wherein when the electric actuator unit is in the non-braking position the enlarged head of the pull rod engages the shoulder of the spindle nut.

According to an embodiment, an electric actuator unit for a drum brake assembly comprises: an electric actuator unit for actuating the drum brake assembly to selectively move a pair of brake shoes of the drum brake assembly between a braking and a non-braking position, the electric actuator unit including a motor, a gear-set operatively coupled to be driven by the motor, a spindle nut operatively coupled to be rotationally driven by the gear-set, a pull rod operatively coupled to be translatorily driven by the spindle nut, and a brake shoe actuation link assembly operatively coupled to be actuated by the pull rod to thereby move the brake shoes between the braking and non-braking positions, the pull rod being operatively coupled to the brake shoe actuation link assembly by a link, the link having a first end pivotally connected to the pull rod and a second end pivotally connected to a second member of the brake shoe actuation link assembly.

Other advantages of this invention will become apparent to those skilled in the art from the following detailed description of the preferred embodiment, when read in light of the accompanying drawings.

DETAILED DESCRIPTION OF THE PREFERRED EMBODIMENTS

Figure 1:
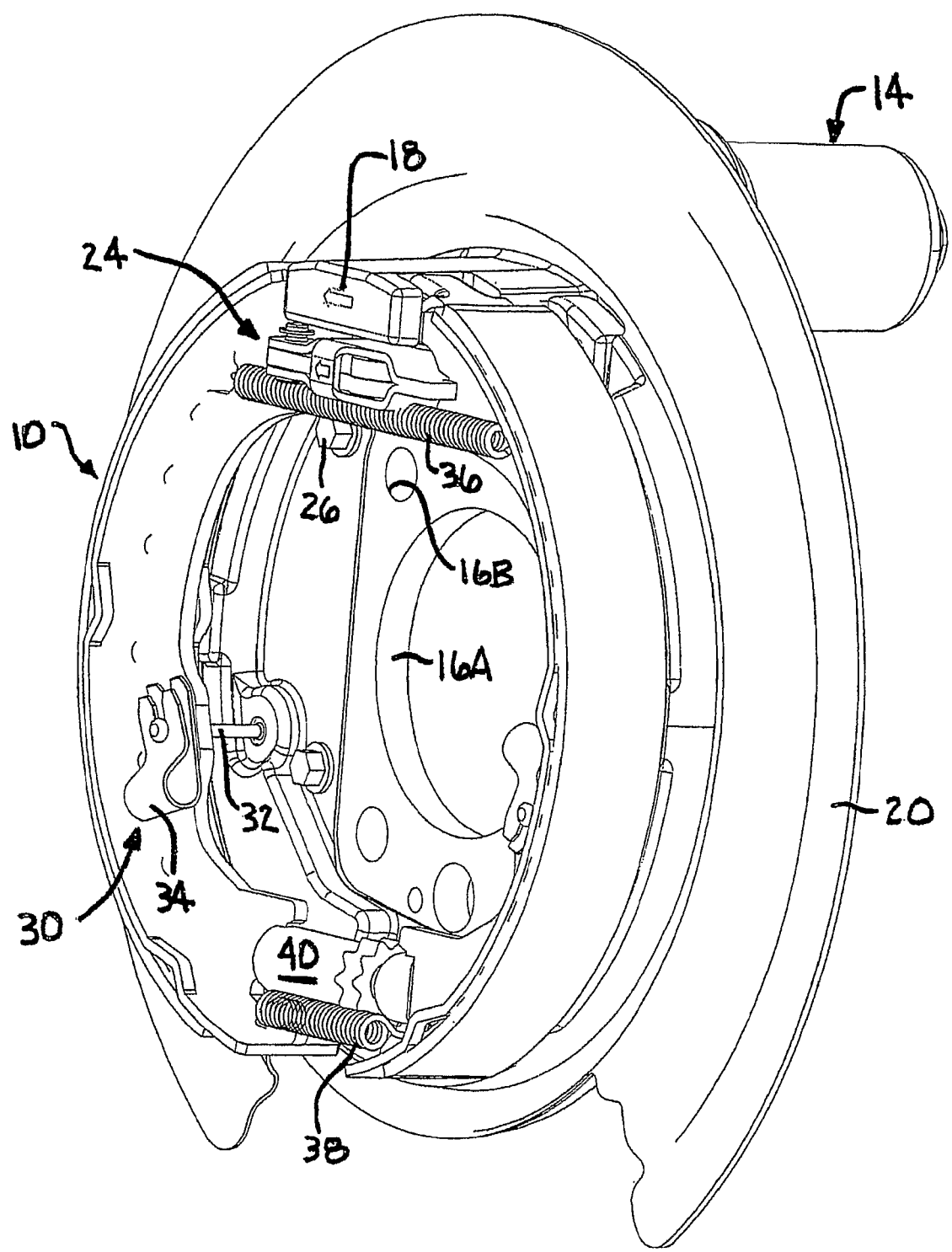
FIG. 1 is a view of a portion of a first embodiment of a vehicle drum-in-hat disc brake assembly including an electric actuator unit for actuating the parking and emergency brake of the vehicle drum-in-hat disc brake assembly.
Figure 2:
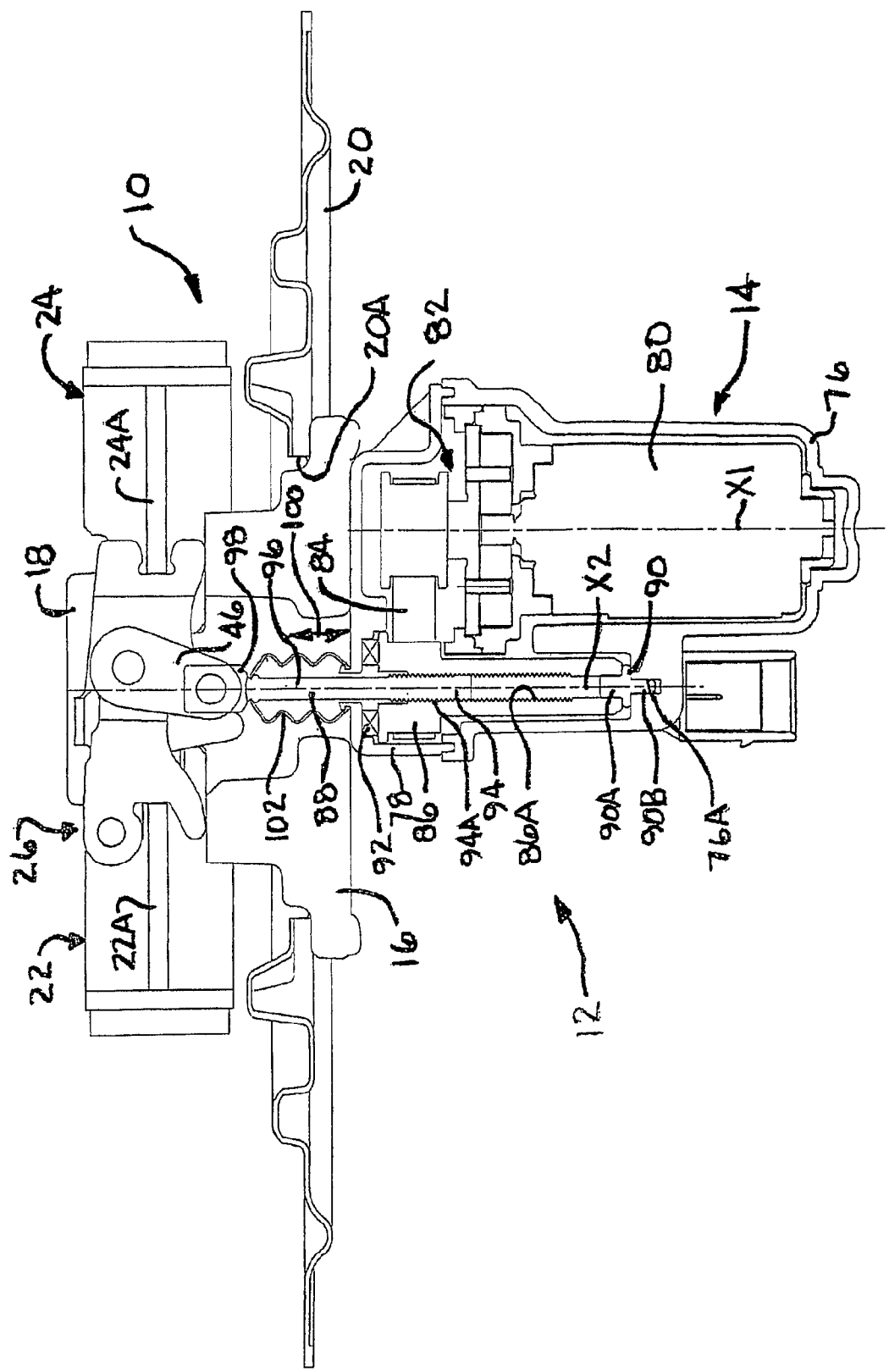
FIG. 2 is another view of the first embodiment of the vehicle drum-in-hat disc brake assembly including the electric actuator unit for actuating the parking and emergency brake illustrated in FIG. 1.

Referring now to the drawings, there is illustrated in FIGS. 1 and 2 a first embodiment of a drum-in-hat parking and emergency brake 10 of a vehicle drum-in-hat disc brake assembly, indicated generally at 12, having an electric actuator unit, indicated generally at 14, for actuating the drum-in-hat parking and emergency brake 10 (i.e., the park brake), thereof. The general structure and operation of the vehicle drum-in-hat disc brake assembly 12 is conventional in the art and may be generally similar to the type illustrated and described in connection with U.S. Pat. No. 5,322,145 to Evans and U.S. Pat. No. 6,729,444 to Schmandt et al., the disclosures of these two patents incorporated by reference in entirety herein. Although this invention will be described and illustrated in connection with the particular vehicle drum-in-hat disc brake assembly 12 disclosed herein, it will be appreciated that this invention may be used in connection with other drum-in-hat disc brake assemblies in connection with the associated parking and emergency brake portion and in connection with drum brake assemblies in connection with the associated service brake portion if so desired. Also, only those portions of the illustrated vehicle drum-in-hat disc brake assembly 12 which are necessary for a full understanding of this invention will be explained and illustrated in detail.

As shown therein, the illustrated vehicle drum-in-hat disc brake assembly 12 includes an adapter or mounting flange 16, an abutment 18, a backing plate 20, a pair of brake shoes 22 and 24, and a park brake shoe actuation link assembly, indicated generally at 26. In the illustrated embodiment, the adapter 16 is a one-piece casting and is adapted to be secured to a fixed, non-rotatable component of the vehicle, such as an axle flange (not shown) or a steering knuckle (not shown) for enclosing a rotatable axle (not shown). To accomplish this, the adapter 16 includes a relatively large opening 16A and a plurality of smaller lug bolt mounting holes 16B formed therein about the opening 16A. The opening 16A permits an outer end of an axle to extend therethrough to the vehicle wheel (not shown), and suitable fasteners (not shown), are disposed in the lug bolt mounting holes 16B to secure the adapter 16 to the associated vehicle component. Also, in this embodiment, the abutment 18 is integrally cast with the adapter 16. Alternatively, the construction or make-up of the adapter 16 and/or the abutment 18 may be other than illustrated and described if so desired.

In the illustrated embodiment, the backing plate 20 of the drum-in-hat disc brake assembly 12 is preferably a stamped metal backing plate and includes a relatively large central opening 20A and a plurality of smaller openings (not shown) formed therein about the central opening 18A of the adapter 18. The central opening 20A of the backing plate 20 permits an outer end of the rotatable axle (not shown) to extend therethrough to a wheel (not shown) of the vehicle. The smaller openings of the backing plate 20 are adapted to receive suitable fasteners, such as the threaded mounting studs 26 shown in FIG. 1, which are received in threaded openings (not shown) of the adapter 16 to secure the backing plate 20 to the adapter 16. Alternatively, the construction or make-up of the backing plate 20 and/or the adapter 16 may be other than illustrated and described if so desired and the securing to one another and/or to other associated vehicle components may be other than illustrated and described if so desired.

In the illustrated embodiment, the brake shoes 22 and 24 supported thereon by conventional pivot pin and spring-clip assemblies, indicated generally at 30. Each of the assemblies 30 includes a pin 32 which extends through an opening (not shown) of the backing plate 20 and through an associated opening (not shown) provided in the brake shoes 22 and 24. The pins 32 have outer ends which are adapted to be fastened or secured to clips 34 of the spring-clip assemblies 30 to thereby secure the brake shoes 22 and 24 to the backing plate 20 in a conventional manner. The illustrated vehicle drum-in-hat disc brake assembly 12 also includes a pair of retraction springs 36 and 38 and a manual brake shoe adjusting mechanism 40. Alternatively, the supporting of the brake shoes 22 and 24 on the backing plate 20 may be other than illustrated if so desired.

Figure 3:
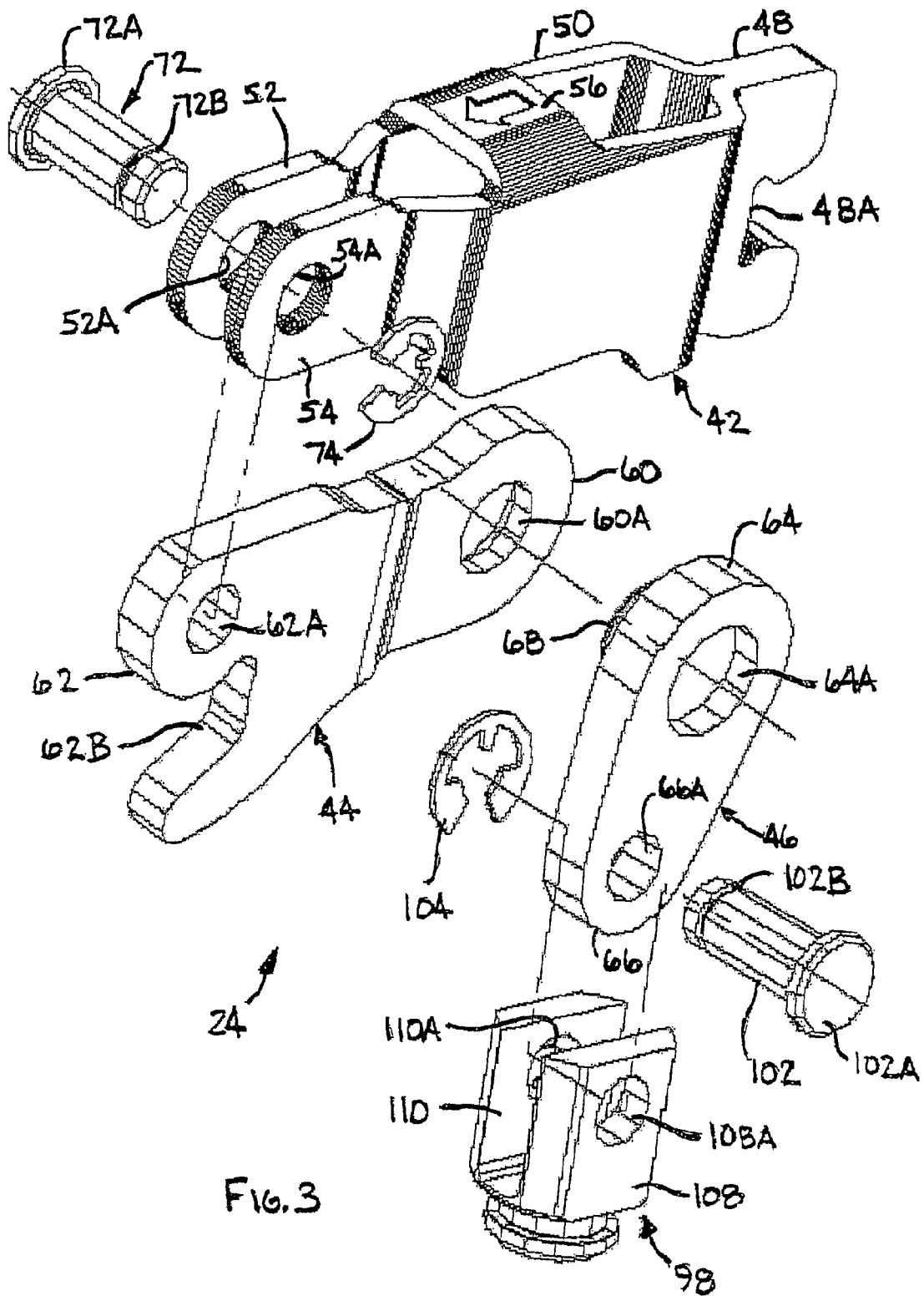
FIG. 3 is a view of selected components of the first embodiment of the vehicle drum-in-hat disc brake assembly illustrated in FIG. 1.
Figure 4:
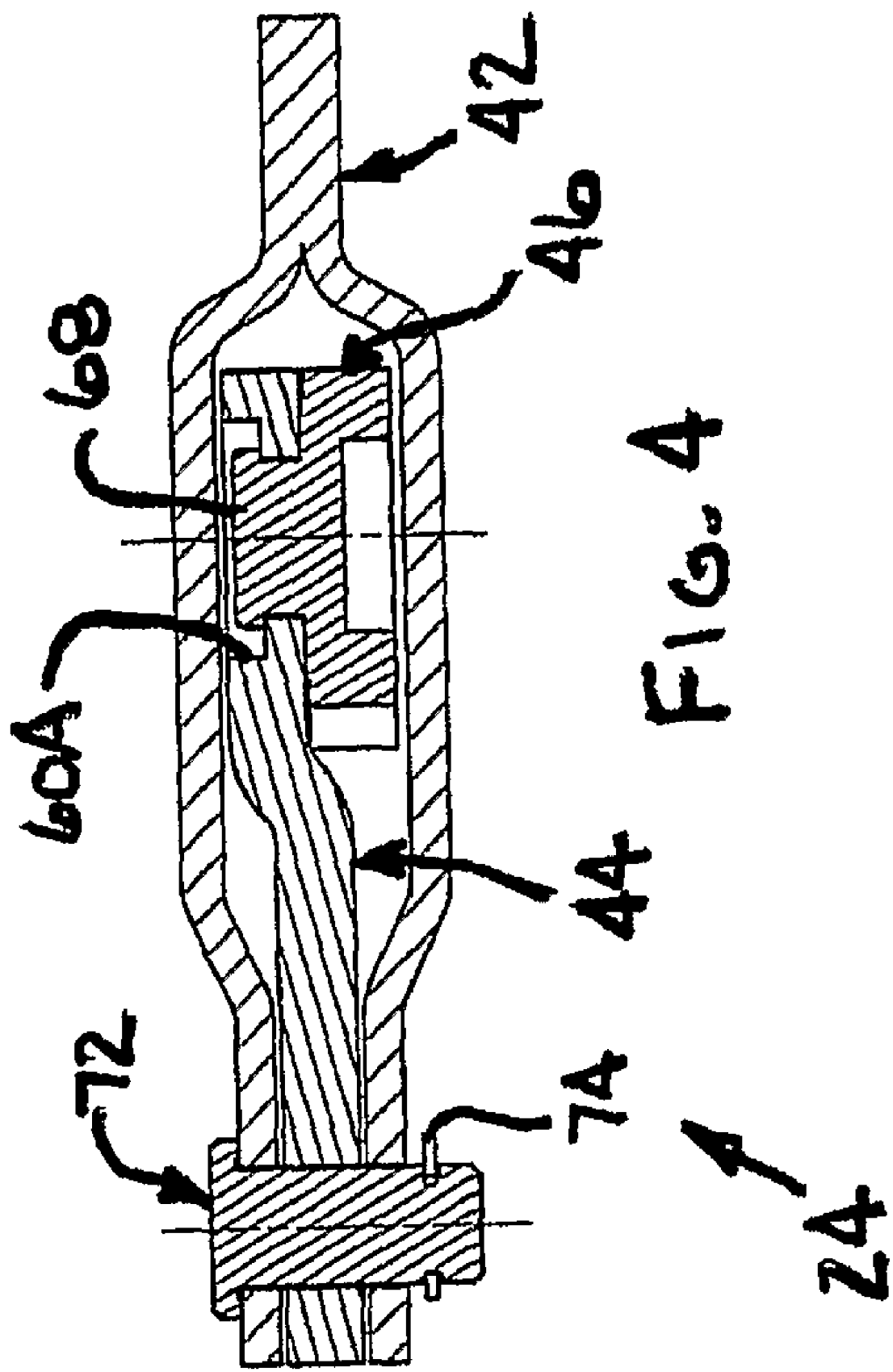
FIG. 4 is a sectional view of selected components of the first embodiment of the vehicle drum-in-hat disc brake assembly illustrated in FIG. 1.

As best shown in FIGS. 3 and 4, the park brake shoe actuation link assembly 26 includes a first "brake shoe actuation" member or link 42, a second "brake shoe actuation" member or link 44, and a third "internal" link member 46. In the illustrated embodiment, the first member 42 is preferably formed as a generally elongated one-piece single stamping from steel and includes a first portion 48 and a second portion 50. The first portion 48 includes a notch 48A provided in an end thereof. As shown in FIG. 2, the end 48 is adapted to receive a web portion 22A of the brake shoe 22.

In the illustrated embodiment, the second portion 50 of the first member 42 is bifurcated and includes a pair of spaced apart arms 52 and 54. Each of the arms 52 and 54 is provided with an opening 52A and 54A, respectively, formed therein near a remote end thereof. The first member 42 further includes an intermediate connecting leg 56 which connects together the arms 52 and 54. Alternatively, the construction or make-up of the first member 42 may be other than illustrated if so desired.

In the illustrated embodiment, the second member 44 is preferably formed as a generally elongated one-piece single stamping from steel and includes a first end 60 and a second end 62. The first end 60 is provided with an opening 60A formed therein. As best shown in FIG. 4, in the illustrated embodiment, the opening 60A is preferably a stepped or countersunk opening for a purpose to be discussed below. The second end 62 is provided with an opening 62A and a notch 62B formed therein. As shown in FIG. 2, the notch 62B is adapted to receive a web portion 24A of the brake shoe 24. Alternatively, the construction or make-up of the second member 44 may be other than illustrated if so desired.

In the illustrated embodiment, the third member 46 is preferably formed as a generally elongated one-piece single stamping from steel and includes a first end 64 and a second end 66. The first end 64 is provided with a non-through opening 64A formed therein. In the illustrated embodiment, the second end 66 is preferably provided with a "semi-pierce" non-through opening 66A formed therein to provide a raised or upstanding "connecting" tab or button 68B extending outwardly from the third member 46 for a purpose to be discussed below. Alternatively, the construction or make-up of the third member 46 may be other than illustrated if so desired.

In the illustrated embodiment, the first member 42 is preferably pivotally connected to the second member 44 by a pivot pin 72 and E-clip 74. The pivot pin 72 includes an enlarged head 72A and a reduced diameter body having a groove or recess 72B formed therein. The pivot pin 72 extends through the openings 52A, 62A and 54A of the arm 52, second member 62, and arm 54, respectively, and the E-clip 74 is installed in the groove 72B of the pin 72 to thereby retain the pin 72 in the installed position. Alternatively, the connection of the first member 42 to the second member 44 may be other than illustrated if so desired.

In the illustrated embodiment, the third member 46 is preferably pivotally connected to the second member 44. To accomplish this, the tab 68 of the third member 46 is inserted through the opening 60A of the end 60 of the second member 44 and then the tab 68 is upset or deformed, as best shown in FIG. 4, to pivotally connect the third member 46 to the second member 44. Alternatively the connection of the third member 46 to the second member 44 may be other than illustrated if so desired. For example, the second member 44 could include the tab instead of the third member 46 or separate fasteners, such as a pivot pin and retaining clip, may be use of so desired.

As best shown in FIG. 2, in the illustrated embodiment, the electric actuator unit 12 for actuating the drum-in-hat parking and emergency brake 10 includes an electric motor 80, a planetary gear-set 82, a belt drive 84, a spindle nut 86, and a pull rod 88. The electric motor 80 is operatively connected to a suitable actuation member (not shown), for actuating the drum-in-hat parking and emergency brake 10. The electric motor 80 may be any suitable type of motor, such as for example a direct current motor.

The planetary gear-set 82 is operatively connected to an output of the electric motor 80 and is effective to increase or multiply the torque output from the motor 80. The belt drive 84 is effective to operatively couple together the planetary gear-set 82 and the spindle nut 86. As shown in FIG. 2, in this embodiment the motor 80 defines a first axis X1 and the spindle nut 86 and pull rod 88 define a second axis X2 which is parallel to and offset relative to the first axis X1 to provide a "double-lobe" actuator unit design.

In the illustrated embodiment, the spindle nut 86 is fixed axially within the unit 12 by suitable means, such as for example by a member 90, but is free to move rotationally therein via the belt drive 84. To accomplish this, the member 90 includes a first end 90A which is preferably press-fit into an opened end of the spindle nut 86 and a second end 90B which is slip fit into an opening 76A provided in a first housing part 76 of the unit 12. Also, a suitable bearing 92, such as an angular contact bearing, is disposed in a second housing part 78 of the unit 12 for supporting the spindle nut 86 for rotation. The spindle nut 86 is provided with internal threads 86A along an inner portion thereof. Alternatively, the spindle nut 86 may be supported for rotation by other suitable means if so desired.

In the illustrated embodiment, the pull rod 88 includes a first end section 94 provided with external threads 94A along a portion thereof, and an opposite second end section 96 having a yoke or clevis-like end member 98 connected thereto by suitable means. The external threads 94A of the pull rod 88 mesh or threadably engage with the internal threads 86A of the spindle nut 86 so that rotational movement of the spindle nut 86 causes translatory or axial movement of the pull rod 88 (as indicated by double arrow 100 in FIG. 2) in a direction generally perpendicular to the backing plate 18 (i.e., in and out of the vehicle drum-in-hat disc brake assembly 12 in FIG. 2). Also, in the illustrated embodiment, a "boot" seal 102 is preferably disposed on the external or "exposed" portion of the pull rod 88 (i.e., the portion of the pull rod 88 which extends from the housing of the electric actuator unit 14).

In the illustrated embodiment, the yoke 98 may be connected to the end 94 of the pull rod 88 by any suitable method, such as for example, welding, press-fit, threading or any other suitable connecting method. Preferably, the method used to connect the yoke 98 to the end 94 of the pull rod 88 permits free rotational movement between the yoke 98 and the third member 46. Alternatively, the yoke 98 may be connected to the end 94 of the pull rod 88 by other means if so desired.

As shown in FIG. 3, in the illustrated embodiment, the yoke 98 is preferably connected to the end 66 of the third member 46 by a pivot pin 102 and an E-clip 104. The pivot pin 102 includes an enlarged head 102A and a groove or recess 102B. The yoke 98 includes a pair of spaced apart arms 108 and 110 each having an opening 108A and 110A, respectively, formed therethrough. To pivotally connect the yoke 98 to the third member 46, the pivot pin 102 extends through the openings 108A, 66A and 110A of the arm 108, third member 46 and arm 110, respectively, and the E-clip 104 is installed in the groove 102B of the pin 102 to thereby retain the pin 72 in the installed position. Alternatively, the connection of the yoke 98 to the third member 46 may be other than illustrated if so desired.

In the operation of the illustrated embodiment, when the third member 46 is actuated (i.e., moved downwardly in the direction of arrow 100 in FIG. 2 via the actuation of the electric unit 14), the first member 42 of the park brake shoes actuation link assembly 26 is effective to engage and operatively move the brake shoes 24 and 22 outwardly into engagement with an inner cylindrical braking surface (not shown) of a drum portion of a drum-in-hat brake rotor brake. Specifically, the first member 42 engages and moves or expands the brake 24 outwardly (to the right in FIG. 2) and the second member 44 engages and moves or expands the brake shoe 22 outwardly (to the left in FIG. 2).

As can be seen in this embodiment, the third member 46 at the connection between the yoke 98 of the pull rod 88 of the second member 44 of the park brake shoes actuation link assembly 26 allows or enables the pull rod 88 to actuated in and out (i.e., pulled generally perpendicular/straight to the shoes as indicated by arrow 100) and the link assembly 26 to move generally back and forth with the wrap of the shoes while reducing or preventing the torque load from the "brake shoe wrap" from being transmitted into the pull rod 88. The term "brake shoe wrap" as used herein means the wrap or rotation of the brake shoes that occurs when the brake shoes are in engagement with the inner cylindrical brake surface of the drum portion of the drum-in-hat brake rotor and rotation of the vehicle occurs. Also, in this embodiment, the double-lobe design is effective to keep the electric actuator unit 12 as small or compact as possible by arranging the motor 80, planetary gear-set 82, and the spindle nut and pull rod assembly on two parallel axis and using a single belt drive 84 to drive these components.

Figure 5:
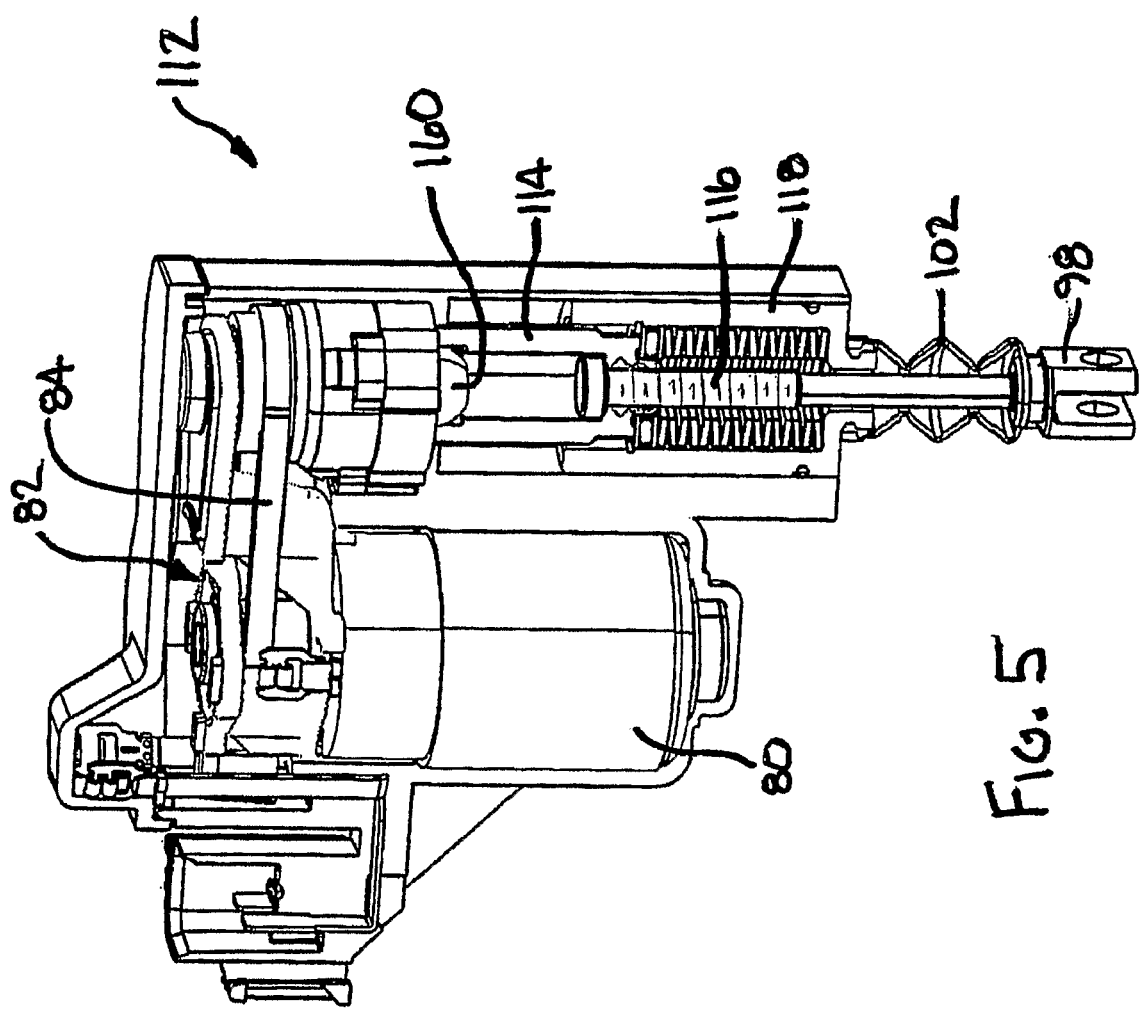
FIG. 5 is a view of a second embodiment of an electric actuator unit for actuating the parking and emergency brake of a vehicle drum-in-hat disc brake assembly, showing the electric actuator unit in a fully unapplied or full non-braking position.
Figure 6:
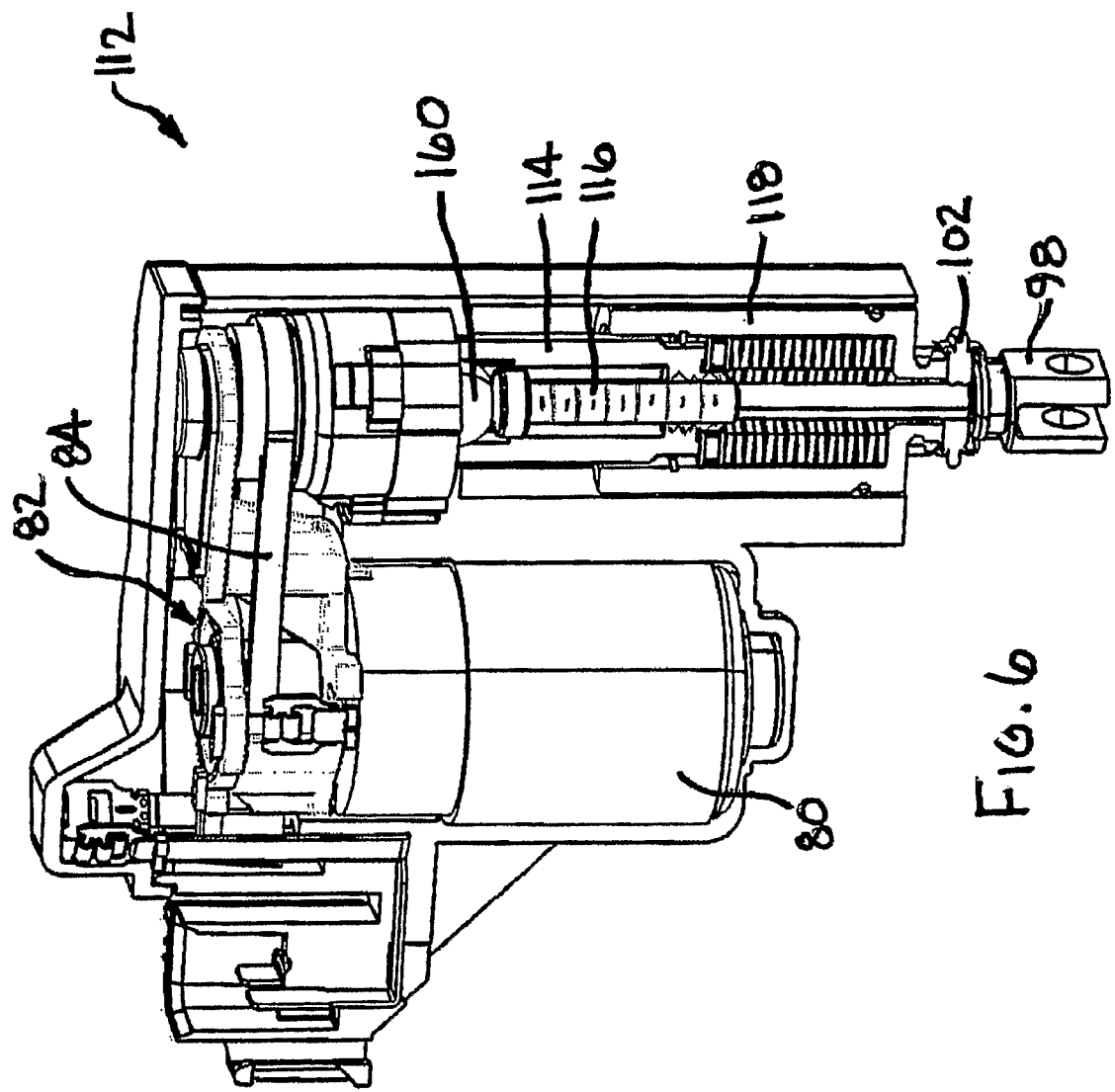
FIG. 6 is another view of the second embodiment of an electric actuator unit for actuating the parking and emergency brake of a vehicle drum-in-hat disc brake assembly illustrated in FIG. 5, showing the electric actuator unit in a fully applied or full braking position.

Turning now to FIGS. 5 and 6 and using like reference numbers to indicate similar or like parts, there is illustrated a second embodiment of an electric actuator unit, indicated generally at 112, for actuating the drum-in-hat parking and emergency brake of a vehicle drum-in-hat disc brake assembly. As shown therein, in this embodiment the electric actuator unit 112 includes the electric motor 80, the planetary gear-set 82, the belt drive 84, a spindle nut 114, a pull rod 116 and a "cartridge" housing 118.

Figure 8:
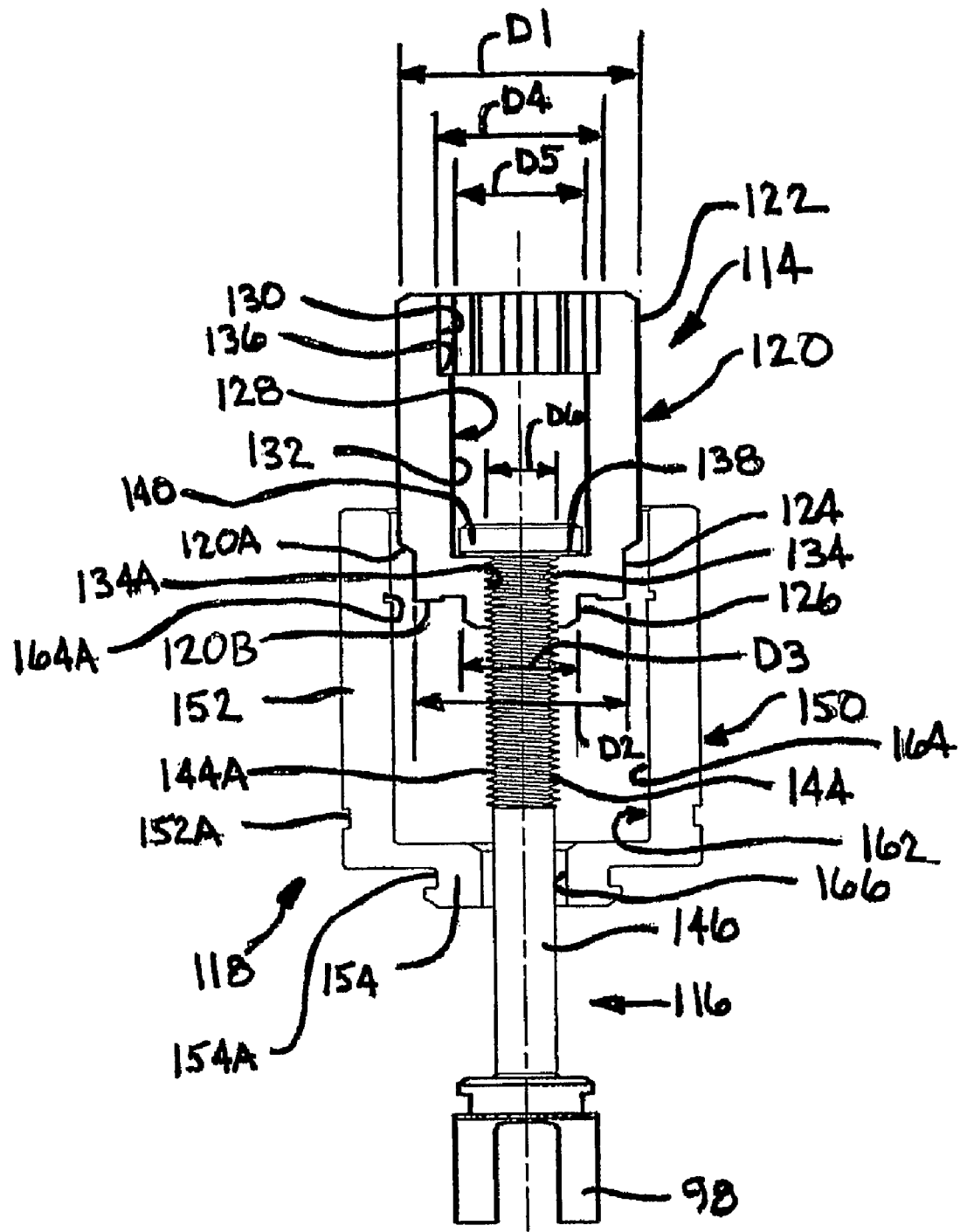
FIG. 8 is a view of selected components of the second embodiment of the electric actuator unit illustrated in FIGS. 5 and 6, showing only some of the components in the assembled condition for discussion purposes.

In the illustrated embodiment, the spindle nut 114 is fixed axially within the unit 112 by suitable means, such as for example by member 160 as will be discussed below, but is free to move rotationally therein via the belt drive 84. As best shown in FIG. 8, the spindle nut 114 includes opened ends and is provided with a stepped outer surface 120 and with a stepped opening 128 formed theretlrough.

In the illustrated embodiment, the outer surface 120 of the spindle nut 114 includes a first portion 122, a reduced diameter second portion 124 and a reduced diameter third portion 126. The first portion 122 defines a first outer diameter D1, the second portion 124 defines a second outer diameter D2 which is less than the first outer diameter, and the third portion 126 defmes a third outer diameter D3 which is less than the second outer diameter D2. The outer surface 120 includes a first shoulder 120A defined at the transition from the first portion 122 to the second portion 124 and a second shoulder 120B defined at the transition from the second portion 124 to the third portion 126. Alternatively, the construction or make-up of the outer surface 120 of the spindle nut 114 may be other than illustrated if so desired.

In the illustrated embodiment, the opening 128 includes a first portion 130, a second portion 132 and a third portion 134. The first portion 130 defines a first inner diameter D4, the second portion 132 defines a second inner diameter D5 which is less than the first inner diameter D4, and the third portion 134 defines a third inner diameter D6 which is less than the second inner diameter D5. The opening 128 includes a first shoulder 136 defined at the transition from the first portion 130 to the second portion 132, and a second shoulder 138 defined at the transition from the second portion 132 to the third portion 134. The third portion 134 is provided with internal threads 134A.

In the illustrated embodiment, the first portion 130 is preferably provided with a "torq" surface so as to receive a correspondingly torqued outer surface of the member 160 to thereby operatively connect the spindle nut 120 to the member 160 for rotation therewith. In operation, the member 160 is operatively connected to an output of the gear-set 82 so as to effect rotation of the spindle nut 120 via the electric motor 14 and belt drive 84. Alternatively, the construction or make-up of the opening 128 may be other than illustrated if so desired.

In the illustrated embodiment, the pull rod 116 includes an enlarged head 140 and a body or shaft 142. The body 142 includes a first portion 144, a second portion 146 and a third portion 148 (best shown in FIG. 7). In the illustrated embodiment, the first portion 144 is provided with external threads 144A, the second portion 146 is non-threaded, and the third portion 148 includes an slightly increased diameter outer surface. The third portion 148 is connected to the yoke 98 by suitable means. Alternatively, the construction of the pull rod 116 may be other than illustrated if so desired.

In the illustrated embodiment, the housing 118 includes opened ends and has an outer surface 150 and an opening 162 formed therethrough. The outer surface 150 is stepped and has a first portion 152 and a reduced diameter second portion 154. The first portion 152 is provided with a circumferential groove or recess 152A formed therein. The second portion 154 is provided with an optional circumferential groove or recess 154A formed therein.

In the illustrated embodiment, the opening 162 is stepped and includes a first portion 164 and a reduced diameter second portion 166. The first portion 164 is provided with a circumferential groove or recess 164A formed therein. Alternatively, the construction or make-up of the outer surface 150 and/or the opening 162 of the housing 118 may be other than illustrated if so desired.

Figure 7:
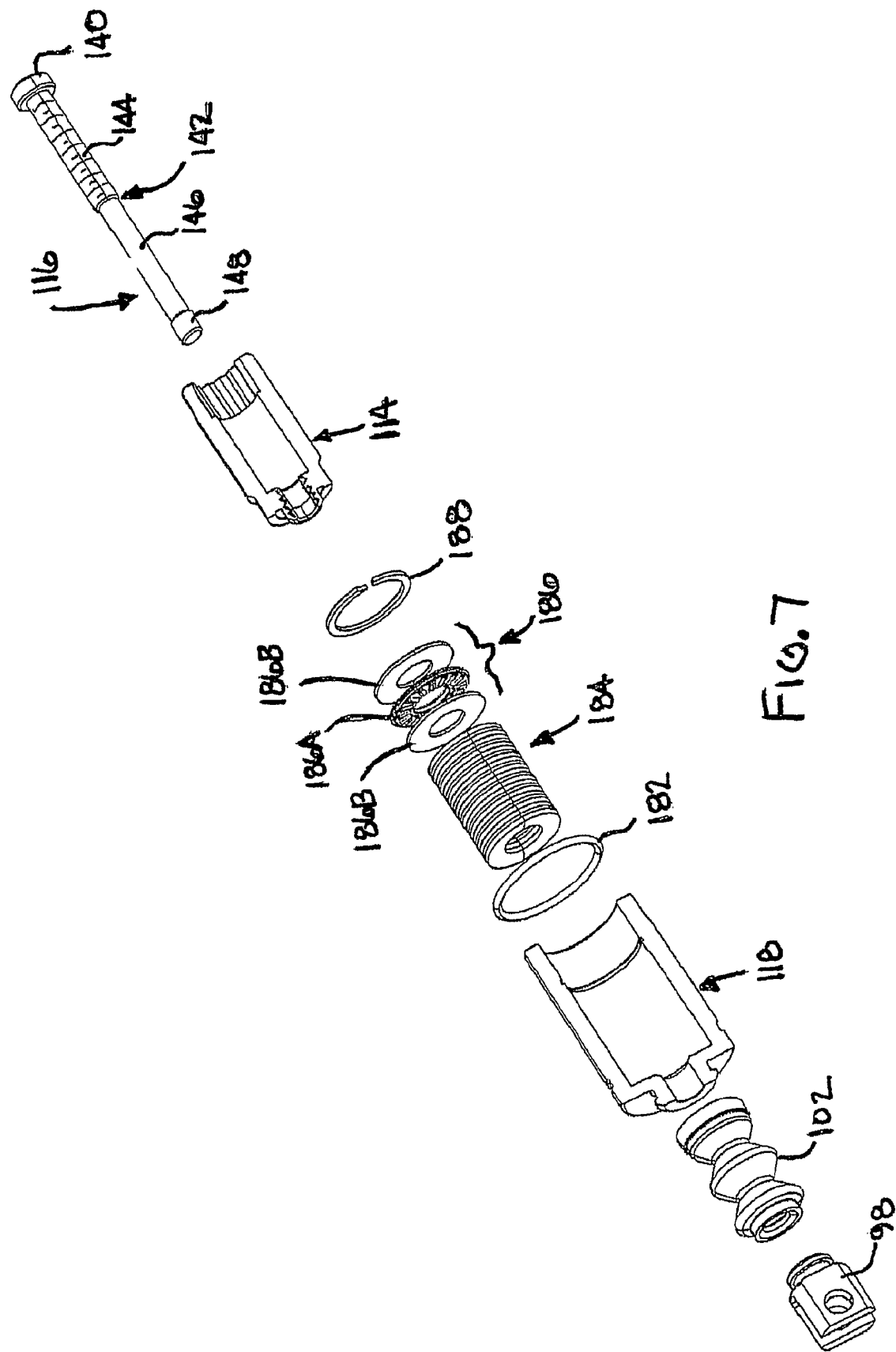
FIG. 7 is an exploded perspective of the selected components of the second embodiment of the electric actuator unit illustrated in FIGS. 5 and 6.

As best shown in FIG. 7, in the illustrated embodiment the cartridge housing 118 further includes an O-ring 182, a spring member 184, a bearing member 186 and a retaining member 188. The O-ring 182 is disposed in the "external" recess 152A of the housing 118. In the illustrated embodiment, the spring member 184 is a stack of conical shaped spring discs known as belleville washers. Alternatively, the spring member 184 may be other than illustrated if so desired. For example, the spring member 184 may be a compression spring.

In the illustrated embodiment, the bearing member 186 includes a thrust bearing 186A disposed between a pair of raceway washers 186B. Alternatively, the bearing member 186 may be other than illustrated if so desired. For example, the bearing member 186 may be a ball bearing or any other suitable bearing if so desired. The retaining member 188 is illustrated as being a C-clip and is disposed in the "internal" recess 134A of the housing 118. Alternatively, the retaining member 188 may be other than illustrated if so desired.

As can be seen in comparing FIGS. 5 and 6, when the electric actuator unit 112 is released and moved from braking position shown in FIG. 6 to the non-braking position shown in FIG. 5, the enlarged head 140 of the pull rod 116 engages or "bottoms out" on the second shoulder 138 of the spindle nut 114. As a result of this, a "mechanical stop" is provided when the electric actuator unit 112 is unapplied and causes the axial load of the pull rod 116 to load into or be transmitted to the adapter of the associated drum-in-hat disc brake assembly.

As can be in this embodiment, the spring member 184 is operative to provide a "follow up force" when the electric actuator unit 112 is actuated in order to provide additional pull rod travel when brake shoe wrap occurs. Also, the connecting of the third member 46 to the second member 44 by using the raised tab 68, provides a small packaging space for the connection and does not require the use of separate fasteners. Also, the concept of the cartridge housing components design of this embodiment (i.e., the components shown in FIG. 7 assembled into the housing 118), may be easily changed or modified and used with a common or standard electric actuator unit (i.e., the unit 112 shown in FIG. 7 without the assembled cartridge housing components).

Figure 9:
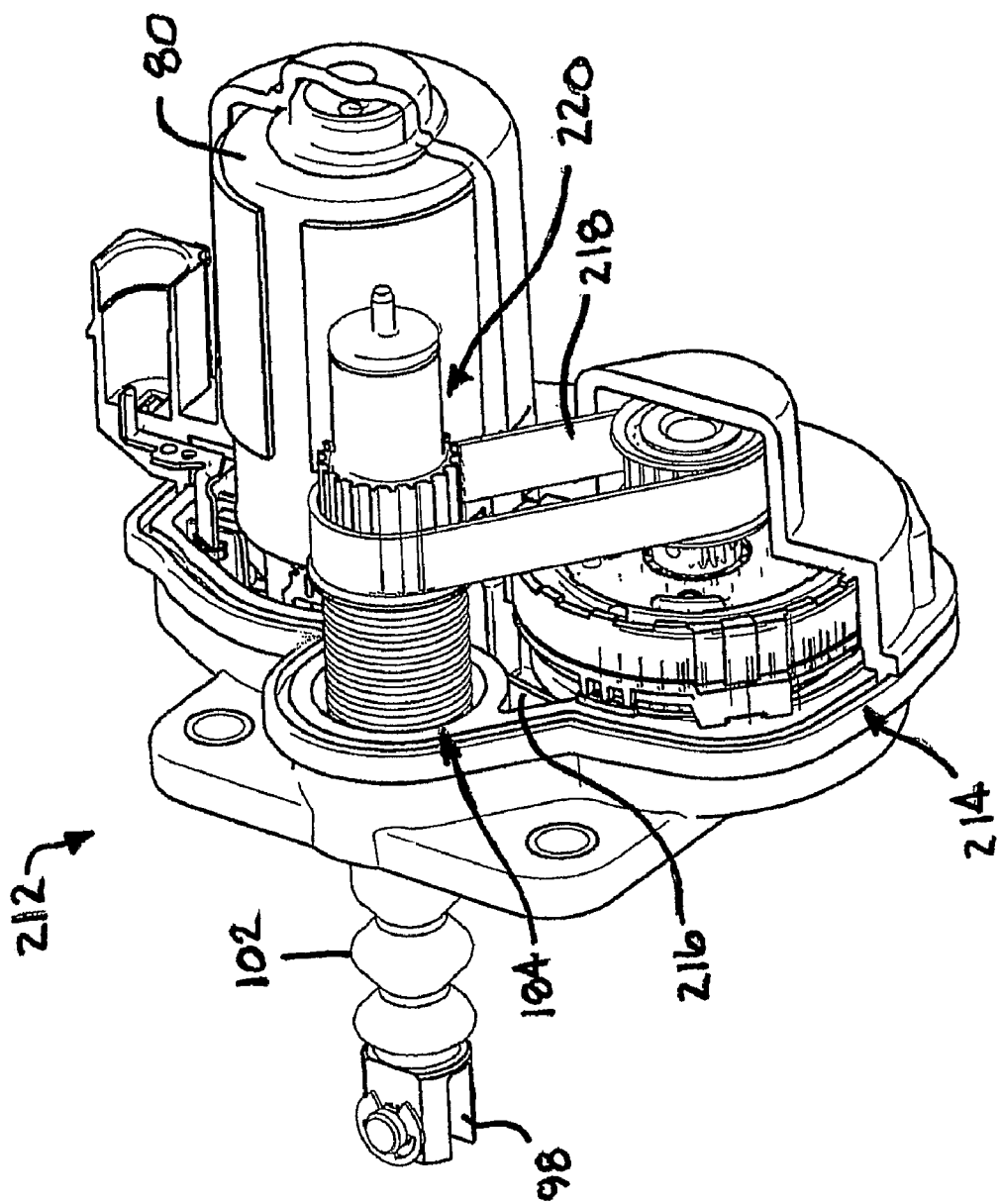
FIG. 9 is a view of a third embodiment of an electric actuator unit for actuating the parking and emergency brake of a vehicle drum-in-hat disc brake assembly.

Turning now to FIG. 9 and using like reference numbers to indicate similar or like parts, there is illustrated a third embodiment of an electric actuator unit, indicated generally at 212, for actuating the drum-in-hat parking and emergency brake of a vehicle drum-in-hat disc brake assembly. As shown therein, in this embodiment the electric actuator unit 212 includes the electric motor 80, a planetary gear-set, indicated generally at 214, a first belt drive 216, a second belt drive 218, and a spindle nut and pull rod assembly, indicated generally at 220.

In this embodiment, the first belt drive 216 operatively connects an output of the motor 80 to an input of the planetary gear-set 214 and the second belt drive 218 operatively connects an output of the planetary gear-set 214 to an input of the spindle nut and pull rod assembly 220. The motor 80 defines a first axis X3, the planetary gear-set 214 defines a second axis X4, and the spindle nut and pull rod assembly 220 defines a third axis X5. In this embodiment, the axes X3, X4 and X5 are parallel to each other and offset relative to each other in a "tri-lobe" like design.

As can be seen in this embodiment, the tri-lobe design is effective to keep the electric actuator unit 212 as small or compact as possible by arranging the motor 80, planetary gear-set 214 and the spindle nut and pull rod assembly 220 on three parallel axis and using two belt drives 216 and 218 to drive these components.

Although this invention has been described and illustrated in connection with the particular vehicle drum-in-hat disc brake assembly 12 disclosed herein, it will be appreciated that this invention may be used in connection with other drum-in-hat disc brake assemblies in connection with the associated parking and emergency brake portion and may also be used in connection with drum brake assemblies in connection with the associated service brake portion if so desired.

In accordance with the provisions of the patent statues, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A drum brake assembly comprising:
a mounting flange having an abutment;
a backing plate secured to said mounting flange, said backing plate having a pair of brake shoes supported thereon;
an electric actuator unit for actuating the drum brake assembly to selectively move said brake shoes between a braking and a non-braking position, said electric actuator unit including a housing, a motor, a gear-set operatively coupled to be driven by said motor, a spindle nut operatively coupled to be rotationally driven by said gear-set, a pull rod operatively coupled to be translatorily driven by said spindle nut, and a brake shoe actuation link assembly directly coupled to an end of said pull rod so as to be actuated by said pull rod to thereby move said brake shoes between said braking and non-braking positions, said end of said pull rod being directly coupled to said brake shoe actuation link assembly by a first link member of said brake shoe actuation link assembly, said first link member having a first end pivotally connected to said end of said pull rod and a second end pivotally connected to a second link member of said brake shoe actuation link assembly; and
a spring member disposed within said housing and around said pull rod so as to be operatively coupled to said pull rod for applying a follow up force to said pull rod when said brake shoes are in said braking position.

2. The drum brake assembly of claim 1 wherein said drum brake assembly is a drum-in-hat disc brake assembly and said electric actuator unit is for actuating a parking and emergency brake of said drum-in-hat disc brake assembly.

3. The drum brake assembly of claim 1 further including a cartridge housing, said cartridge housing adapted to carry said spring member, said spindle nut and said pull rod.

4. The drum brake assembly of claim 1 wherein said motor defines a first axis and said spindle nut and said pull rod defines a second axis which is parallel to said first axis.

5. The drum brake assembly of claim 1 wherein said motor defines a first axis, said spindle nut defines a second axis, and said pull rod defines a third axis, said first, second and third axes being parallel to one another.

6. The drum brake assembly of claim 1 wherein said second link member of said brake shoe actuation link assembly is pivotally connected to a third link member of said brake shoe actuation link assembly.

7. The drum brake assembly of claim 1 wherein one of said first link and said second link member includes a raised tab, the other one of said first link and said second link member includes a countersunk opening, and wherein said first link is operatively coupled to said second link member by deforming a portion of said raised tab into said countersunk opening.

8. The drum brake assembly of claim 1 wherein said pull rod includes an externally threaded portion and said spindle nut includes an internally threaded portion which meshes with said externally threaded portion of said pull rod whereby rotation of said spindle nut causes translatory movement of said pull rod.

9. The drum brake assembly of claim 1 wherein said pull rod includes an enlarged head, said spindle nut includes a shoulder, and wherein when said electric actuator unit is in said non-braking position said enlarged head of said pull rod engages said shoulder of said spindle nut.

10. An electric actuator unit for a drum brake assembly comprising:
an electric actuator unit for actuating the drum brake assembly to selectively move a pair of brake shoes of the drum brake assembly between a braking and a non-braking position, said electric actuator unit including a housing, a motor, a gear-set operatively coupled to be driven by said motor, a spindle nut operatively coupled to be rotationally driven by said gear-set, a pull rod operatively coupled to be translatorily driven by said spindle nut, and a brake shoe actuation link assembly directly coupled to an end of said pull rod so as to be actuated by said pull rod to thereby move the brake shoes between the braking and non-braking positions, said end of said pull rod being directly coupled to said brake shoe actuation link assembly by a first link member of said brake shoe actuation link assembly, said first link member having a first end pivotally connected to said end of said pull rod and a second end pivotally connected to a second link member of said brake shoe actuation link assembly; and
a spring member disposed within said housing and around said pull rod so as to be operatively coupled to said pull rod for applying a follow up force to said pull rod when the brake shoes are in the braking position.

11. The electric actuator unit of claim 10 wherein said drum brake assembly is a drum-in-hat disc brake assembly and said electric actuator unit is for actuating a parking and emergency brake of said drum-in-hat disc brake assembly.

12. The electric actuator unit of claim 10 further including a cartridge housing, said cartridge housing adapted to carry said spring member, said spindle nut and said pull rod.

13. The electric actuator unit of claim 10 wherein said motor defines a first axis and said spindle nut and said pull rod defines a second axis which is parallel to said first axis.

14. The electric actuator unit of claim 10 wherein said motor defines a first axis, said spindle nut defines a second axis, and said pull rod defines a third axis, said first, second and third axes being parallel to one another.

15. The electric actuator unit of claim 10 wherein said second link member of said brake shoe actuation link assembly is pivotally connected to a third link member of said brake shoe actuation link assembly.

16. The electric actuator unit of claim 10 wherein one of said first link and said second link member includes a raised tab, the other one of said first link and said second link member includes a countersunk opening, and wherein said first link member is operatively coupled to said second member by deforming a portion of said raised tab into said countersunk opening.

17. The electric actuator unit of claim 10 wherein said pull rod includes an externally threaded portion and said spindle nut includes an internally threaded portion which meshes with said externally threaded portion of said pull rod whereby rotation of said spindle nut causes translatory movement of said pull rod.

18. The electric actuator unit of claim 10 wherein said pull rod includes an enlarged head, said spindle nut includes a shoulder, and wherein when said electric actuator unit is in said non-braking position said enlarged head of said pull rod engages said shoulder of said spindle nut.

19. Apparatus adapted for use in a drum brake assembly comprising:

an electric actuator unit including a housing, a motor, a gear-set operatively coupled to be driven by said motor, a spindle nut operatively coupled to be rotationally driven by said gear-set, a pull rod operatively coupled to be translatorily driven by said spindle nut, and a brake shoe actuation link assembly directly coupled to an end of said pull rod so as to be actuated by said pull rod to thereby move a pair of brake shoes of the drum brake assembly between braking and non-braking positions, said end of said pull rod being directly coupled to said brake shoe actuation link assembly; and means disposed around said pull rod for applying a follow up force to said pull rod when the brake shoes are in the braking position.

20. The apparatus of claim 19 wherein said pull rod includes an enlarged head, said spindle nut includes a shoulder, and wherein when said electric actuator unit is in the non-braking position said enlarged head of said pull rod engages said shoulder of said spindle nut.

* * * * *